(12) United States Patent
Wilfinger et al.

(10) Patent No.: US 6,462,124 B2
(45) Date of Patent: Oct. 8, 2002

(54) WATER-DILUTABLE COATING OF OH-ACRLYLATE OR POLYESTERURETHANE RESIN AND BLOCKED ACID CATALYST

(75) Inventors: Werner Wilfinger; Ingo Kriessmann, both of Graz (AT); Friedrich Herrmann, Wuppertal; Angelika Boehme, Leverkusen, both of (DE)

(73) Assignee: Solutia Austria GmbH, Graz (AT)

( * ) Notice: Subject to any disclaimer, the term of this patent is extended or adjusted under 35 U.S.C. 154(b) by 19 days.

(21) Appl. No.: 09/808,996

(22) Filed: Mar. 16, 2001

(65) Prior Publication Data

US 2001/0018494 A1 Aug. 30, 2001

Related U.S. Application Data

(62) Division of application No. 09/080,298, filed on May 18, 1998, now Pat. No. 6,204,332, which is a continuation of application No. 08/513,946, filed as application No. PCT/AT94/00024 on Mar. 8, 1994, now abandoned.

(30) Foreign Application Priority Data

Mar. 9, 1993 (DE) .......................... 43 07 423

(51) Int. Cl.[7] .......................... C08K 3/20; C08L 33/14; C08L 63/02; C08L 75/06
(52) U.S. Cl. .................. 524/507; 523/408; 523/410; 523/412; 523/416; 524/512; 525/108; 525/110; 525/123; 525/162; 525/223; 525/438; 525/443
(58) Field of Search ................. 523/408, 410, 523/412, 416; 524/512, 507; 525/108, 110, 123, 162, 221, 223, 438, 443

(56) References Cited

U.S. PATENT DOCUMENTS

| | | | |
|---|---|---|---|
| 3,959,554 A | 5/1976 | Hick | 525/162 |
| 3,996,177 A | 12/1976 | Ludwig | 524/512 |
| 4,093,575 A | 6/1978 | Hagan | 524/502 |
| 4,141,871 A | 2/1979 | Shimp et al. | 524/540 |
| 4,192,826 A | 3/1980 | Beresniewicz et al. | 525/425 |
| 4,469,841 A | 9/1984 | Hart et al. | 524/512 |
| 4,517,327 A | 5/1985 | Heaps et al. | 523/512 |
| 4,976,813 A | 12/1990 | Salenski et al. | 156/230 |
| 5,419,929 A | 5/1995 | Ishidoya et al. | 427/386 |
| 5,549,929 A | 8/1996 | Scheibelhoffer et al. | 525/438 |
| 5,552,184 A * | 9/1996 | Klostermann et al. | 427/284 |

FOREIGN PATENT DOCUMENTS

| | | |
|---|---|---|
| DE | 2 360 098 | 6/1974 |
| DE | 41 23 080 | 1/1993 |
| FR | 2 208 953 | 6/1974 |
| GB | 1 413 054 | 11/1975 |
| JP | 55-36276 A * | 3/1980 |
| JP | 4-366187 A * | 12/1992 |

* cited by examiner

*Primary Examiner*—Robert E.L. Sellers
(74) *Attorney, Agent, or Firm*—Foley & Lardner

(57) ABSTRACT

A base-neutralized, water-diluted coating comprises (A) a polyhydroxyl-functional resin of an acrylate resin or an oil-free polyester containing urethane groups, (B) an amino resin partially etherified with an alcohol, (C) a basic neutralizing agent, (D) water, and (E) a water-insoluble crosslinking catalyst of a strong organic or inorganic acid such as p-toluenesulfonic acid blocked with a monoepoxide, diepoxide or lactone.

4 Claims, No Drawings

WATER-DILUTABLE COATING OF OH-ACRLYLATE OR POLYESTERURETHANE RESIN AND BLOCKED ACID CATALYST

This is a Divisional Application of application Ser. No. 09/080,298, filed May 18, 1998, U.S. Pat. No. 6,204,332, which is a continuation of application Ser. No. 08/513,946 filed Sep. 8, 1995, abandoned, which is the national phase application of PCT/AT94/00024 filed Mar. 8, 1994.

The invention relates to oven-drying coating materials which are water-dilutable after neutralization with bases and are based on combinations of polyhydroxyl-functional addition polymerization resins and/or polycondensation resins and/or polyaddition resins and/or emulsion copolymers which are water-dilutable after neutralization with bases, with amino resins which are at least partially etherified with monoalcohols, which coating materials contain nonionically blocked strong acids as crosslinking catalysts.

The crosslinking reaction of oven-drying coating materials which contain polyhydroxyl-functional binders in combination with amino resins is in practice catalyzed in numerous instances by strong acids, these acids being present, if desired, in a blocked use form.

For water-dilutable coating materials which are converted into their water-soluble form by neutralization with bases it is exclusively ionically blocked acids, mostly in the form of the ammonium salts or quaternary amine salts, which are used.

In coating materials based on organic solvents, nonionically blocked acids are recommended as crosslinking catalysts, in particular, for electrostatically sprayable coating materials, since the tonically blocked or free acids, which are generally preferred, cannot be employed, owing to their high conductivity.

It has now surprisingly been found that, despite their insolubility in water, nonionically blocked acids can also be employed as crosslinking catalysts in coating materials which are water-dilutable after neutralization with bases, and that substantial technical advantages can be achieved by this measure.

The invention accordingly relates to oven-drying coating materials which are water-dilutable after neutralization with bases and are based on combinations of polyhydroxyl-functional addition polymerization resins and/or polycondensation resins and/or polyaddition resins and/or emulsion copolymers which are water-dilutable after neutralization with bases, with amino resins which are at least partially etherified with monoalcohols, which coating materials are characterized in that they contain nonionically blocked strong acids as crosslinking catalysts.

Although in many cases, when ionically blocked catalysts are used in water-dilutable coating materials under the stoving conditions which exist in practice, wrinkling can be observed on the film surface, this defect does not occur with the coating materials described in accordance with the invention. Moreover, the stoved coating films exhibit an improvement in resistance to acid agents ("acid rain").

The polyhydroxyl-functional addition polymerization resins, polycondensation resins, polyaddition resins and emulsion copolymers which are suitable for the formulation of the coating materials and are water-dilutable after neutralization with bases, and the common modifications of these resins, are described in large numbers in the literature and are therefore known to those skilled in the art.

Similarly, amino resins are known as crosslinking components, preference being given for the coating materials according to the invention to amino resins having a high degree of etherification, especially HMMM (hexamethoxymethylmelamine) grades.

As nonionically blocked acids, reaction products of toluene-4-sulfonic acid, dinonylnaphthalenesulfonic acid, methylphosphonic acid, phenylphosphonic acid and orthophosphoric acid with monoepoxide compounds, diepoxide compounds, lactones, hydroxyl-functional ethers and alcohols are used. If desired, it is also possible to employ mixtures of the starting products and/or of the nonionically blocked acids. The nonionically blocked acids which are employed in accordance with the invention are either commercial products or can be prepared in a relatively simple manner.

The thermally unstable ester bonds of the crosslinking catalysts only cleave at temperatures at which the neutralizing agent which is present in the binder has already escaped from the film to a substantial extent.

The examples which follow illustrate the invention without restricting it in its scope. All parts and percentages relate, unless otherwise specified, to units by weight. The term "$H^+$ latent" is intended to indicate that the acid becomes effective only after thermal cleavage.

(A) Preparation and Definition of the Catalysts (A1) 380 parts of toluene-4-sulfonic acid monohydrate (2 mol) are dissolved at 50° C. in 120 parts of ethanol (technical grade) with stirring in a suitable reaction vessel. Then 372 parts of ethylhexyl glycidyl ether (2 mol) are added continuously, during which the temperature of the reaction mixture should not exceed 60° C. The temperature is then raised to 80° C. and maintained until the acid number has fallen below 10 mg of KOH/g. If appropriate, the batch must be corrected with appropriate proportions of ethylhexyl glycidyl ether. The oil which results after the solvent has been stripped off in vacuo has a content of 0.27 mol of $H^+$ latent/100 g.

(A2) In the same manner as described in (A1), 95 parts of a diepoxy resin based on bisphenol A (epoxide equivalent weight 190) are heated to 60° C., and at this temperature a solution of 76 parts of p-toluenesulfonic acid monohydrate (0.4 mol) in 76 parts of ethanol (technical grade) is added continuously. Esterification is carried out at 60° C. until the acid number is below 10 mg of KOH/g. The product which results after the solvent has been stripped off has a content of 0.23 mol of $H^+$ latent/100 g.

(A3) In the same manner as described in (A1), 250 parts (1 mol) of Versatic acid glycidyl ester (CARDURA E 10, SHELL) are added at 40° C. to 38.4 parts (0.33 mol) of orthophosphoric acid (85% strength in $H_2O$), and esterification is carried out at 60° C. until the acid number is below 10 mg of KOH/g. The product has a content of 0.35 mol of $H^+$ latent/100 g.

(A4) In the same manner as described in (A1), 460 parts (1 mol) of dinonylnaphthalenesulfonic acid in a solution of 480 parts of methyl ethyl ketone are reacted with 114 parts (1 mol) of 6-caprolactone [sic] at 70° C. The product has a content of 0.09 mol of $H^+$ latent/100 g.

(A5) Commercially available, nonionically blocked acid catalyst based on toluene-4-sulfonic acid, 50% strength in xylene (KATALYSATOR 1203, HÜLS AG, DE)

(A6) Commercially available, nonionic catalyst based on an epoxide-blocked dinonylnaphthalenesulfonic acid, 42% strength in xylene/MIBK (1:1). (NACURE® 1419, King Industries Inc., USA)

(A7C) Comparison product: tonically blocked toluene-4-sulfonic acid prepared from 190 parts of toluene-4-sulfonic acid monohydrate (1 mol), 89 parts (1 mol) of dimethylethanolamine and 101 parts of water. The product has a content of 0.26 mol of $H^+$ latent/100 g.

(B) Preparation and Definition of the Polyhydroxyl-functional Coating Binders (B1) Reaction product of (B1a) an acrylate copolymer prepared by copolymerization of 20, parts of methacrylic acid, 33 parts of butyl acrylate, 35 parts of styrene and 12 parts of ethylhexyl acrylate in the presence of 3 parts of azobisisovaleronitrile (ABVN) and 103 parts of isopropanol.
Solids content: 50% by weight
Acid number: about 150 mg of KOH/g
Viscosity: about 280 mPa.s/20° C.
and (B1b) an acrylate copolymer prepared by copolymerization of 18 parts of ethyl acrylate, 32 parts of methyl methacrylate, 30 parts of hydroxyethyl methacrylate and 20 parts of ethlyhexyl [sic] acrylate in the presence of 3 parts of ABVN and 55, 5 parts [sic] of isopropanol.
Solids content: about 65% by weight
Hydroxyl number: about 130 mg of KOH/g
Viscosity: about 1140 mPa.s/20° C.

50 parts of component (B1a) are mixed with 116 parts of component (B1b), and the mixture is freed from the solvent under vacuum. The mixture has a solids content of 96% by weight and an intrinsic viscosity of 11.3 ml/g ($CHCl_3$, 20° C.). The components are subjected to partial condensation at 125° C. for about 4 hours, the intrinsic viscosity rising to 13.9 ml/g.

Subsequently, 5.0 parts of dimethylethanolamine and 25 parts of crosslinking agent C1 (see below) are added. After cooling to 90° C., adding 2.5 parts of catalyst (A1) and diluting with deionized water to a solids content of 47% by weight, an emulsion is obtained which has a pH of 8.6 and a viscosity of 1700 mPa.s/20° C.

The quantity of catalyst added corresponds to a content of 0.0053 mol of $H^+$ latent/100 g of solids in the overall coating binder.

(B2) Commercially available, anionically stabilized acrylate resin dispersion neutralized beforehand with dimethylethanolamine, 50% strength in water (RESYDROL® SW 383, VIANOVA, AT).

(B3) Commercially available, water-dilutable acrylate resin, 70% strength in diethylene glycol monobutyl ether, as combination partner for (B2) (RESYDROL® SW 484, VIANOVA, AT).

(B4) Commercially available, water-dilutable acrylate resin, 70% strength (RESYDROL® VWY 03, VIANOVA, AT).

(B5) Commercially available, water-dilutable, oil-free polyester, containing urethane groups, 35% strength in water (RESYDROL® VWA 5490, VIANOVA, AT).

(B6) Commercially available, water-dilutable alkyd resin, fatty acid-modified, containing urethane groups, 40% in water (RESYDROL® VWA 5478, VIANOVA, AT).

(B7) Commercially available, water-dilutable, oil-free alkyd resin, 75% strength in ethylene glycol monobutyl ether (RESYDROL® VWA 5188, VIANOVA, AT).

(B8) Corresponds to resin (B1) but without crosslinking agent, solids content 45%.

(C) Definition of the Amino Resins (C1) Commercially available hexamethoxymethylmelamine, 100% pure (MAPRENAL® MF 904, HOECHST, DE)

(C2) Commercially available, highly reactive melamine-formaldehyde resin, 80% strength in n-butanol (MAPRENAL® VMF 3615, HOECHST, DE)

EXAMPLES 1–12

In accordance with the data in Table 1, coating materials were prepared:.

The clearcoats (Examples 1–5), after the components indicated have been mixed with dimethylethanolamine, were adjusted to a pH of 7.8–8.6 and diluted for spray application with water to a viscosity of from 23 to 28 sec. (DIN 53211/23° C.).

The coating materials according to Examples 6, 7, 8 and 10–12 were ground in a conventional manner on a bead mill, adjusted with dimethylethanolamine to a pH of from 7.5 to 8.7 and diluted for spray application with water to the spray viscosity of from 23 to 30 seconds (DIN 53211/23° C.).

For the coating material according to Example 9, the aluminum paste was predispersed in water/ethylene glycol monobutyl ether and slowly admixed to the prediluted clearcoat solution. After thorough mixing (60 to 90 minutes), the coating material was adjusted with dimethylethanolamine to a pH of from 7.5 to 8.0 and diluted for spray application with water to the spray viscosity of from 20 to 23 sec. (DIN 53211/23° C.).

Explanations for Table 1

(1) Comparison examples
(2) Aluminum pigment paste AQUAVEX® 504 AR-107 P from SILBERLINE, GB (non-leafing, medium-fine 400 mesh aluminum pigment in polypropylene glycol and additives)
(3) Acrylate copolymer VISCALEX® HV 30 from ALLIED COLLOIDS, GB
(4) Liquid UV absorber CGL-384 from CIBA-GEIGY, CH
(5) TINUVIN® 123 from CIBA-GEIVY, CH
(6) ADDITOL® XW 329 from VIANOVA, AT
(7) already present in the resin (B1)

Application and testing of the coating materials:
Spray application with the following dry film thicknesses:

| Clearcoats: | about 35 µm |
| Topcoats: | about 35 µm |
| Basecoats: | about 15 µm |
| Primers: | about 40 µm |
| Fillers: | about 35 µm |

To test for wrinkling, the coating materials were applied with increasing dry film thicknesses (starting from about 10 µm).

The stoving conditions and the test results are described in Table 2.

Explanations for Table 2

(1) Film thickness in µm at which wrinkling begins in the topcoat.
(2) according to DIN 53157, 23° C. at 35 µm film thickness
(3) visual assessment: 0 no yellowing
1 slight yellowing
2 distinct yellowing
(4) 30% strength $H_2SO_4$ at 25° C., blemishing after 16 hours
N Not affected
S Slightly affected
M Markedly affected
(5) Comparison examples

TABLE 1

| | Coating type | | | | | | | | | | | |
|---|---|---|---|---|---|---|---|---|---|---|---|---|
| | Clearcoats | | | | Topcoats | | | Basecoats | | Primer | | Filler |
| Example | 1 | 2 | 3[1] | 4[1] | 5 | 6 | 7 | 8 | 9 | 10 | 11 | 12 |
| Resin: (B1) 47% | 212.8 | | | | | | | | | | | |
| (B2) 50% | | | | | 120.0 | | | | | | | |
| (B3) 70% | | | | | 25.7 | | | | | | | |
| (B4) 70% | | | | | | 107.1 | | | | | | |
| (B5) 35% | | | | | | | 208.6 | | | | | |
| (B6) 40% | | | | | | | | | | 217.5 | | 212.5 |
| (B7) 75% | | | | | | | | | | | 106.7 | |
| (B8) 45% | | 177.8 | 177.8 | 177.8 | | | | 188.9 | 200.0 | | | |
| Crosslinking component | (7) | | | | | | | | | | | |
| (C1) 100% | | 20.0 | 20.0 | 20.0 | 22.0 | 25.0 | 27.0 | | | 13.0 | 20.0 | 15.0 |
| (C2) 80% | | | | | | | | 18.8 | 12.5 | | | |
| DMEA | | | | | | 6.2 | | | | | | |
| $TiO_2$ | | | | | | 80.0 | 70.0 | 120.0 | | 70.0 | 70.0 | 100.0 |
| Aluminum paste[2] | | | | | | | | | 17.4 | | | |
| Thickener, 10% in H2O/DMEA (3) | | | | | | | | 15.0 | 25.0 | | 3.0 | |
| Catalyst | (7) | | | | | | | | | | | |
| (A1) | | 2.0 | | | | | | | | | 3.0 | |
| (A2) | | | | | 3.4 | | | | | | | |
| (A3) | | | | | | 3.5 | | | | | | |
| (A4) | | | | | | | | 5.0 | | | | |
| (A5) | | | | | | | 4.0 | | | 1.0 | | 1.5 |
| (A6) | | | | | | | | | 4.0 | | | |
| (A7C) | | | 2.0 | | | | | | | | | |
| Light stabilizer (4) | 1.8 | | | | 1.4 | | | | | | | |
| (5) | 0.9 | | | | 0.7 | | | | | | | |
| Leveling agent (6) | 0.3 | 0.3 | 0.3 | 0.3 | 0.3 | 0.3 | 0.3 | | | 0.3 | 0.3 | |
| Ethylene glycol monobutyl ether | | | | | | | | 30.0 | 10.0 | | | |
| Deionized water | | | | | 12.0 | 43.0 | | 60.0 | 70.0 | | | 44.0 |

TABLE 2

| Metal test panel | Coating according to Example Stoving condition (min/° C.) | Wrinkling[1] from μm | Pendulum hardness[2] sec | Yellowing[3] | $H_2SO_4$ resistance[4] |
|---|---|---|---|---|---|
| 1 | 1 (20/150) | over 50 | 172 | 0 | N |
| 2 | 2 (20/150) | over 50 | 156 | 0 | N |
| 3 | 3 (20/150) (5) | about 20 | not measurable (wrinkling) | 2 | M |
| 4 | 4 (20/150) (5) | over 50 | not measurable (tacky) | 0 | not measurable |
| 5 | 5 (20/150) | over 50 | 148 | 0 | N |
| 6 | 6 (20/150) | over 40 | 130 | 0 | N |
| 7 | 7 (20/150) | over 50 | 175 | 1 | N |
| 8 | 12 (20/140) 8 (5/60) 5 (20/150) | over 50 | 110 | 0 | N |
| 9 | 12 (20/140) 9 (5/60) 5 (20/150) | over 50 | 105 | 0 | N |
| 10 | 10 (20/140) 7 (20/150) | about 50 | 139 | 1 | N |
| 11 | 11 (20/140) 6 (20/150) | over 40 | 115 | 0 | S |

What is claimed is:

1. An oven-drying, water dilutable coating material comprising: (A) at least one polyhydroxyl functional resin selected from the group consisting of water-dilutable acrylate resin dispersions and water-dilutable oil-free polyester resins containing urethane groups which resins are water-dilutable after neutralisation; (B) an amino resin at least partially etherified with a monoalcohol; (C) a basic neutralizing agent; (D) water; and (E) a cross-linking catalyst which is the water-insoluble non-ionically blocked reaction product of one or more strong organic or inorganic acids, and at least one compound selected from the group-consisting of a monoepoxide, a diepoxide, and a lactone, wherein the neutralizing agent (C) present in the coating material has already substantially escaped from the film at temperatures at which the ester bonds of said reaction product (E) are cleaved.

2. A coating material according to claim 1, wherein the polyhydroxy functional resin is an acrylate resin dispersion.

3. A coating material according to claim 1, wherein the wherein the polyhydroxy functional resin is an oil free polyester resin containing urethane groups.

4. A coating material according to claim 1, wherein the crosslinking catalyst (E) comprises the reaction product of at least one strong organic or inorganic acid selected from the group consisting of toluene-4-sulfonic acid, dinonylnaphthalene sulfonic acid, methylphosphoric acid, phenylphosphoric acid, and orthophosphoric acid with at least one compound selected from the group consisting of a monoepoxide, a diepoxide, and a lactone.

* * * * *